United States Patent
Camp, Jr.

(10) Patent No.: US 7,269,424 B2
(45) Date of Patent: Sep. 11, 2007

(54) MOBILE TERMINAL IMPLEMENTING A RANGING SIGNAL RECEIVER AND METHOD

(75) Inventor: William O. Camp, Jr., Chapel Hill, NC (US)

(73) Assignee: Sony Ericsson Mobile Communications AB (SE)

( * ) Notice: Subject to any disclaimer, the term of this patent is extended or adjusted under 35 U.S.C. 154(b) by 306 days.

(21) Appl. No.: 10/065,413

(22) Filed: Oct. 16, 2002

(65) Prior Publication Data

US 2004/0203715 A1 Oct. 14, 2004

(51) Int. Cl.
H04Q 7/20 (2006.01)

(52) U.S. Cl. .............................. 455/456.1; 455/456.6; 455/456.5; 455/533.1; 455/339; 455/422.1; 455/180.2; 455/67.11; 455/189.1; 455/208; 455/3.06; 455/141; 342/458

(58) Field of Classification Search .............. 455/456.1, 455/423, 110.2, 188.2, 12.1, 189.1, 552, 553.1, 455/168.1, 176.1, 306, 339, 254, 426, 266; 342/357.01, 357.1, 152, 463, 450; 375/150, 375/343, 350; 725/62, 63, 73

See application file for complete search history.

(56) References Cited

U.S. PATENT DOCUMENTS

| | | | |
|---|---|---|---|
| 5,510,801 A | 4/1996 | Engelbrecht et al. | |
| 5,600,706 A | 2/1997 | Feuerstein et al. | |
| 6,035,202 A * | 3/2000 | Camp, Jr. ................ | 455/456.1 |
| 6,097,974 A | 8/2000 | Camp, Jr. et al. | |
| 6,166,685 A * | 12/2000 | Soliman .................. | 342/357.1 |
| 6,252,543 B1 | 6/2001 | Camp | |
| 6,522,297 B1 * | 2/2003 | Rabinowitz et al. ........ | 342/458 |
| 6,539,231 B1 * | 3/2003 | Hamilton et al. ........ | 455/456.1 |
| 6,559,800 B2 * | 5/2003 | Rabinowitz et al. ........ | 342/457 |
| 6,717,547 B2 * | 4/2004 | Spilker et al. .............. | 342/464 |
| 6,917,328 B2 * | 7/2005 | Rabinowitz et al. ... | 342/357.06 |
| 2002/0144294 A1 * | 10/2002 | Rabinowitz et al. ........ | 725/139 |

(Continued)

FOREIGN PATENT DOCUMENTS

WO WO99 33308 A 7/1999

OTHER PUBLICATIONS

Brugess et al., *Supporting Rosum Positioning Technology in a GSM Network*, Rosum Corporation Whitepaper, Mar. 19, 2002.

(Continued)

Primary Examiner—Charles N. Appiah
Assistant Examiner—Willie J. Daniel, Jr.
(74) Attorney, Agent, or Firm—Steven B. Phillips; Moore & Van Allen PLLC (57) ABSTRACT

Mobile terminal implementing a ranging signal receiver and method. Means are provided to incorporate ranging signal reception capability into a mobile terminal (such as a UMTS terminal) notwithstanding the fact that the ranging signal has a bandwidth that is wider than the bandpass of filtering for native signals within the terminal. A ranging signal receiving subsystem receives broadband signals that comprise synchronization bursts, which are equally spaced in time, such as from digital television stations. A common filter will have a bandpass that is smaller than the bandwidth of the ranging signals. However, the correlation subsystem of the mobile terminal enables recovery of synchronization bursts by correlating the ranging signal with a known sequence that has been predistorted to account for the bandpass of the common filter.

15 Claims, 7 Drawing Sheets

U.S. PATENT DOCUMENTS

2003/0122711 A1* 7/2003 Panasik et al. ............. 342/387
2003/0236065 A1* 12/2003 Leinonen et al. .......... 455/3.05
2004/0048623 A1* 3/2004 Flannery ................. 455/456.6

OTHER PUBLICATIONS

Rabinowitz et al., *Positioning Using the ATSC Digital Television Signal*, Rosum Corporation Whitepaper, Aug. 7, 2001.

* cited by examiner

MOBILE TERMINAL IMPLEMENTING A RANGING SIGNAL RECEIVER AND METHOD

BACKGROUND OF INVENTION

Wireless communication systems have been commonly employed to provide voice and data communications to subscribers within prescribed geographic areas. For example, analog cellular telephone systems have been deployed successfully throughout the world. Recently, digital cellular systems such as those specified in the "IS-136" standard for North America and the Global System for Mobile (GSM) standard in Europe, North America, and elsewhere have been deployed. Attempts to unify and modernize the global, mobile communications networks have culminated in the so-called "3G" or third generation standards. These standards call for a wide-band code division multiplexed access (WCDMA) communication system. A subscriber terminal for this system is referred to as an "universal mobile telecommunication system" terminal, or simply a "UMTS" terminal. 3G and UMTS are just beginning to be deployed, and are extensively discussed in the International Telecommunication Union (ITU) Standard IMT-2000, the most recent version of which is incorporated herein by reference.

Figure 1:
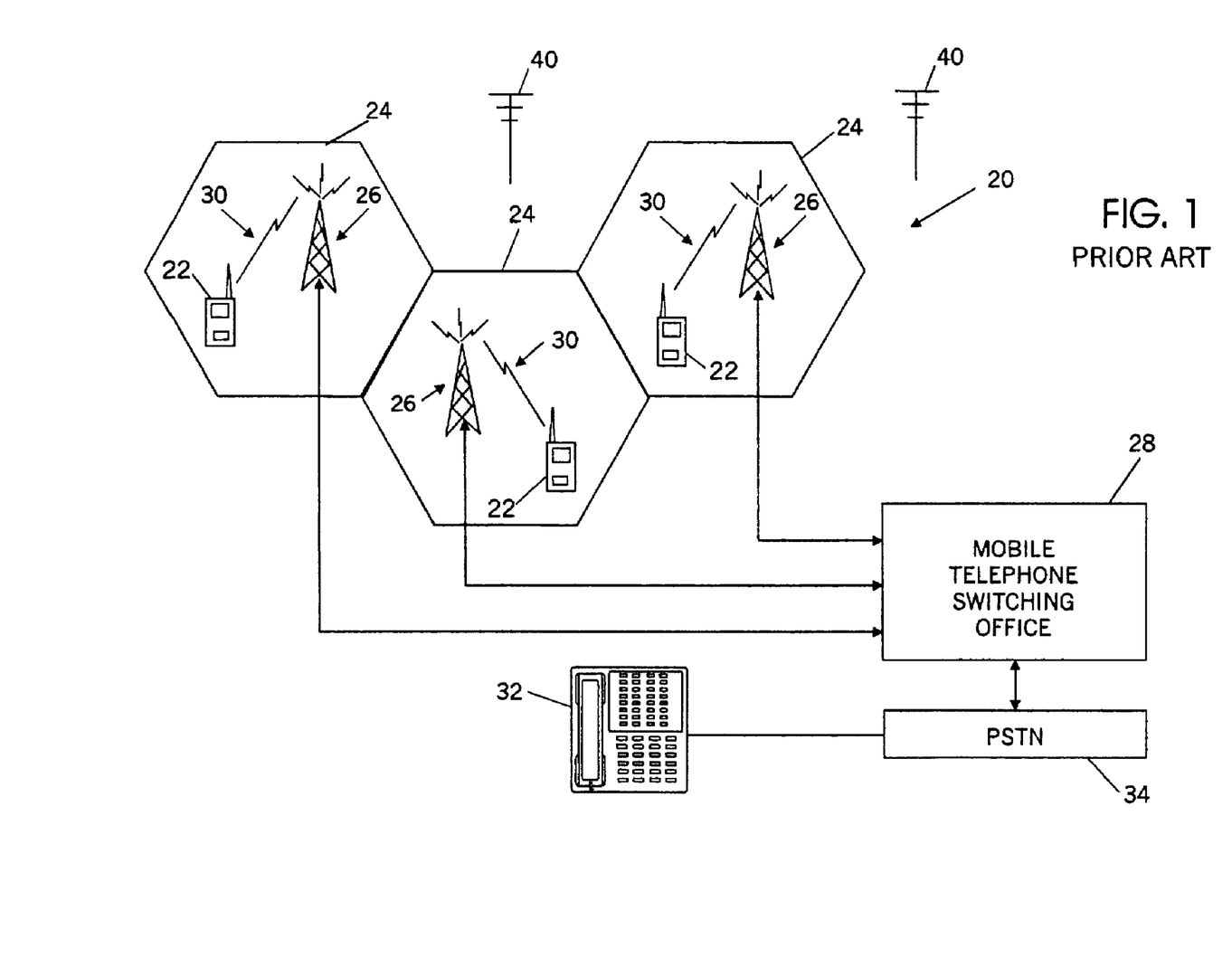
FIG. 1 illustrates the operating environment for the invention.

FIG. 1 illustrates a typical wireless communication system according to any of the standards, including IMT-2000. In FIG. 1, communication system 20 includes one or more wireless mobile terminals 22 that communicate with a plurality of cells 24 served by base stations 26 and a mobile telephone switching office (MTSO) 28. Only three cells are shown for clarity, but a typical network would include hundreds of Users of mobile communication system 20 can communicate with users of traditional, landline telephones 32 through the public switched telephone network (PSTN) 34.

Determining the location of a subscriber within a mobile communication system has been a challenge for many years. Location determination can be important for locating a subscriber who has made an emergency call. Often, subscribers using mobile phone systems are not familiar with the locale, and may not be able to describe a location to emergency service personnel. Numerous proposals have been introduced to provide location determination capability to the wireless telecommunication infrastructure. One proposal, which has been implemented in a limited fashion, is to use the global positioning system (GPS) for determining the location of mobile terminals. GPS is a space based triangulation system using satellites and computers to measure positions anywhere on earth. GPS signals have similar, or narrower bandwidths than UMTS or CDMA2000 (a second generation wireless standard) digital wireless telecommunication network signals. Therefore, GPS reception capabilities can be efficiently combined into UMTS and some second generation mobile terminals. However, because the satellites are always moving, position location algorithms are complex. Additionally, GPS signals are weak and may not always be received.

Proposals have recently been introduced to use digital television station signals as ranging signals for position determination in lieu of using GPS signals. Digital television was first implemented in the United States in 1998. As of the end of 2000, 167 stations were on the air broadcasting digital television signals. As of early 2001, over 1,000 digital television station construction permits had been acted on by the U.S. Federal Communications Commission. Therefore, digital television stations, 40 of FIG. 1, will eventually be disbursed adjacent to the wireless telecommunication network infrastructure, at least in the U.S., and probably in other countries. It is, however, difficult to receive digital television signals through the components of a typical mobile terminal, even a UMTS (also referred to as WCDMA) terminal. This difficulty results from the fact that digital television signals have a bandwidth that is wider than the bandwidth of mobile communication terminal signals.

SUMMARY OF INVENTION

The present invention provides a means to efficiently incorporate ranging signal reception capability into a mobile terminal, notwithstanding the fact that the ranging signal has a bandwidth which is wider than even WCDMA bandwidth, and hence wider than the bandpass of at least some of the filters within, for example, a UMTS terminal. The disclosed embodiments discuss using synchronization bursts within a digital television signal for ranging. However, the invention is broadly applicable to the extraction of repeating bursts of information from any signal which is wider than filters within a UMTS or other type of mobile terminal, including CDMA2000, IS-95, Bluetooth, etc.

A mobile terminal according to some embodiments of the invention includes a radio subsystem, which receives the native, mobile terminal signals. In some embodiments the native radio system is a code division multiplexed access (CDMA) or a wideband CDMA (WCDMA) system. However, the terms "native", "native signal", "radio" and "radio signal" and the like are used to refer to whatever the normal two-way telecommunication signaling and system is that is used by the particular mobile terminal in question. A ranging signal receiving subsystem is also included. This second subsystem receives terrestrial ranging signals which comprise synchronization bursts which are equally spaced in time. As previously mentioned, digital television (DTV) signals are well adapted to this purpose, although other types of signals which may be promulgated in the future could be used in the same way. The radio subsystem and the ranging signal receiving subsystem can share a variety of common components. Which components are shared depends on the specific embodiment of the mobile terminal. However, at least one common filter is operatively connected to the radio subsystem and the ranging signal receiving subsystem. This filter will often be a base band filter, but could also be an intermediate frequency (IF) filter. The common filter, being primarily designed for the radio subsystem will have a bandpass that it is smaller than the bandwidth of the ranging system. However, the correlation subsystem of the mobile terminal enables recovery of synchronization bursts by correlating the ranging signal with a known sequence that has been predistorted to account for the bandpass of the common filter.

The speed and accuracy of correlating to the ranging signal can be improved by limiting the correlation window to be searched according to the approximate location of the mobile terminal within the communications network. Alternatively, multiple correlations can be performed at times separated by one over a known rate of occurrence of the synchronization bursts. As previously mentioned, additional components can be shared in common between the radio subsystem and the ranging signal receiving subsystem according to the engineering design choice of those implementing a mobile terminal according to the invention. These shared elements or stages can include, among other things, a shared mixer, a shared amplifier, and/or a shared local oscillator. Also, the digital processing performing correlation functions and/or filtering function can be shared.

As is typical with mobile terminals, various components that are used to implement the invention may be implemented in hardware, microcode, software, or a combination of the foregoing. The correlation subsystem is typically implemented in a digital signal processor, and the process is controlled by microcode installed in the terminal. Microcode controls the operation of the mobile terminal to receive the ranging signal, pass the ranging signal through the common filter and other shared components, and correlate the ranging signal with the known sequence that has been predistorted. The hardware and microcode, or software of the mobile terminal form the means to carry out the processes of the invention. This too can be shared between both functions as stated above.

DETAILED DESCRIPTION

As previously mentioned, the combination of a GPS system receiver and a mobile terminal of various types has been previously conceived and developed. However, the channel bandwidth of GPS and the channel bandwidth of UMTS or some second generation wireless terminal systems in use up until now, has been similar, or at least the bandwidth for the wireless terminal signals has been wider than that for GPS signals. In order to accommodate a desire to use wider band ranging signals for position determination, a mismatch between the bandwidths of the two signal types has to be dealt with. For terrestrial ranging, digital television (DTV) signals are a likely candidate, since these signals contain repetitive synchronization bursts which can be timed for multiple DTV stations in order to allow triangulation and location determination. In this case, timing information will have to be provided from an external source. However, the wireless network base stations could easily provide this information to mobile terminals, especially to mobile terminals of the UMTS type. Such mobile terminals are designed to allow simultaneous exchange of voice and data at reasonably high rates.

The advantages of using DTV signals for ranging as opposed to GPS are numerous. First, DTV stations are geographically fixed—they never move. Therefore, position information does not have to be continually updated as with GPS. Secondly, DTV stations transmit with megawatts of effective radiated power. Thus, DTV signals can be typically received inside buildings and other sheltered areas where the comparatively weak GPS signals are sometimes blocked. Additionally, there will eventually be enough DTV stations so that significant redundancy can be built into the system. DTV stations, operating independently of one another, would seldom all go off the air at the same time.

DTV signals can be used for ranging because a DTV signal includes synchronization bursts in each frame of information. In reality, each frame includes two synchronization bursts, but one is essentially a copy of the other with some bits inverted. Either synchronization burst is periodic, and contains 600 to 800 bits. The format of the digital TV signal is specified by the Advanced Television Systems committee (ATSC) in Standard Document A/53B, published Aug. 7, 2001, which is incorporated herein by reference. If timing information is made available to mobile terminals, and if the synchronization bursts can be recovered from DTV signals, travel time from DTV stations can be multiplied by the speed of light to calculate a range for each DTV station in view. If three DTV stations can be seen, triangulation can provide a location. If only two DTV stations can be seen, the wireless telecommunication network base station which is being accessed can provide a third triangulation point. The details of timing calculations, triangulation, and position location techniques are well known by those of skill in the art, and are beyond the scope of the present disclosure. Suffice to say, it is necessary to be able to recover synchronization pulses from broadband sources such as digital television stations in order to use those sources for position determination.

For the purposes of the specific embodiments disclosed herein, it should be assumed that DTV television signals according to the ATSC standard will be used for ranging in a wireless telecommunication network. Further, it should be assumed that the mobile terminal in which the invention is implemented will be a UMTS-terminal which communicates via WCDMA protocols. In this case, the digital TV signal is approximately 6 MHz wide. However, the UMTS receiver bandpass is only approximately 4.2 MHz wide. If an attempt is made to use common baseband filters to receive both the WCDMA signal and the DTV signal, the DTV signal will be attenuated and distorted by the loss of high frequency content. The net effect will be to cause the correlation on the signal to have more dispersion and, therefore, be less accurate in the time alignment between the received signal and the internally generated version of the signal to which it is being compared in the correlator. Thus, conventional correlation techniques could not be used to recover and demodulate the DTV signal in order to ascertain the timing of synchronization bursts.

The present invention takes advantage of the fact that no actual information needs to be demodulated from a DTV signal in order to use the signal for ranging. Unlike the case with GPS, position and velocity information need not be reported to mobile terminals since DTV stations are not moving and their position does not change. Likewise, as previously mentioned, timing can be set by agreement or information can be provided to mobile terminals from another source. Thus, all that is necessary is for the mobile terminal to be able to ascertain the timing of synchronization bursts in a DTV signal. The signal itself need not be demodulated.

According to the invention, common elements or stages can be used for both the WCDMA signal and the DTV signal, including a common baseband filter. A system according to the invention simply accepts the heavy distortion caused by passing the broadband DTV signal of a relatively large bandwidth through a filter with a narrower bandpass. Synchronization bursts are recovered and correlated by taking the relatively narrow baseband filter bandpass into account in the correlation process rather than using a normal correlation process. The effect of limiting the receiver bandwidth is to remove all high frequency transitions within the DTV signal. However, the known sequence being searched for and correlated on has many contiguous ones or zeros that are two or more chirps in duration. The energy from these sequence fragments is not removed by the narrow receiver bandwidth. Therefore, correlation can be accomplished by predistorting the known sequence to which correlation is being performed. For example, the sampling rate of the analog-to-digital converters within a UMTS terminal might be four times the UMTS chip rate or 15.36 megasamples per second. The UMTS chip rate refers to the highest symbol rate of 3.84 megasymbols per second that is transmitted by the UMTS transmitter. The data rate is less than the chip rate. A digital signal processor within the terminal performs correlation between two signals where one contains the known pattern at some offset from the time reference of the terminal and shifts the known sequence in time with respect to the received signal until it is correctly synchronized. This process results in a correlation spike for that time position. The narrow filtering causes distortions which would cause false correlation and yield imprecise results. However, if the known sequence being searched for is predistorted properly, correlation is performed between two distorted sequences rather than one distorted sequence and one undistorted sequence.

Figure 2:
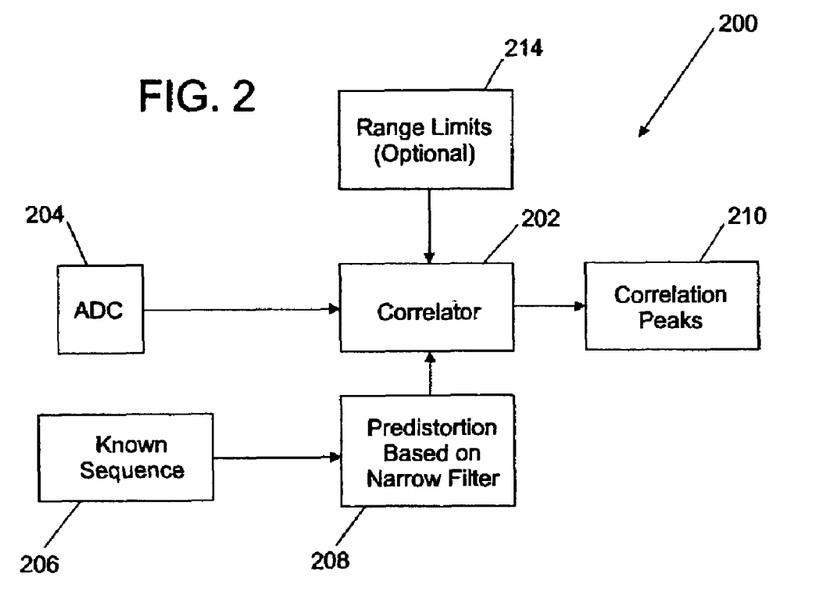
FIG. 2 is a functional block diagram of the correlation subsystem of a mobile terminal according to one embodiment of the present invention.

FIG. 2 is a block diagram illustrating the method and apparatus of a correlation subsystem 200 according to some embodiments of the invention. Arrows between the various blocks indicate both operative connections between the components and signal flow that is indicative of the method of the invention. The correlation subsystem is operatively connected to analog-to-digital converter (ADC) 204. Correlator 202 receives signals from the ADC. Correlator 202 compares signals received from ADC 204 with a known sequence 206. In typical correlation subsystems, the known sequence is correlated directly with the receive signal. However, according to the disclosed embodiments of the invention, predistortion 208 is added to the signal path between the known sequence and the correlator. The predistortion is based on the characteristics of the baseband filter used within the mobile terminal. The predistortion, 208, causes a known sequence to take on the same characteristics as the sequence takes on when received over the air from ADC 204. Therefore, correlation peaks 210 are output by the correlator and can be used to recover synchronization burst timing with sufficient accuracy.

If the synchronization bursts within the ranging signal are of sufficient length, a subsystem like that shown in FIG. 2 as discussed thus far should have no trouble correlating the signal. This is typically the case with digital TV synchronization bursts. However, it may be necessary to improve the speed and accuracy of the correlation to maintain a useful system in the event that new standards allow for shorter synchronization bursts, or in the event that other types of broadband signals with repeated synchronization patterns are to be used for ranging. One way to improve the correlation performance of a subsystem like that shown in FIG. 2 is to input correlation range limits 214 into the correlator.

Figure 3:
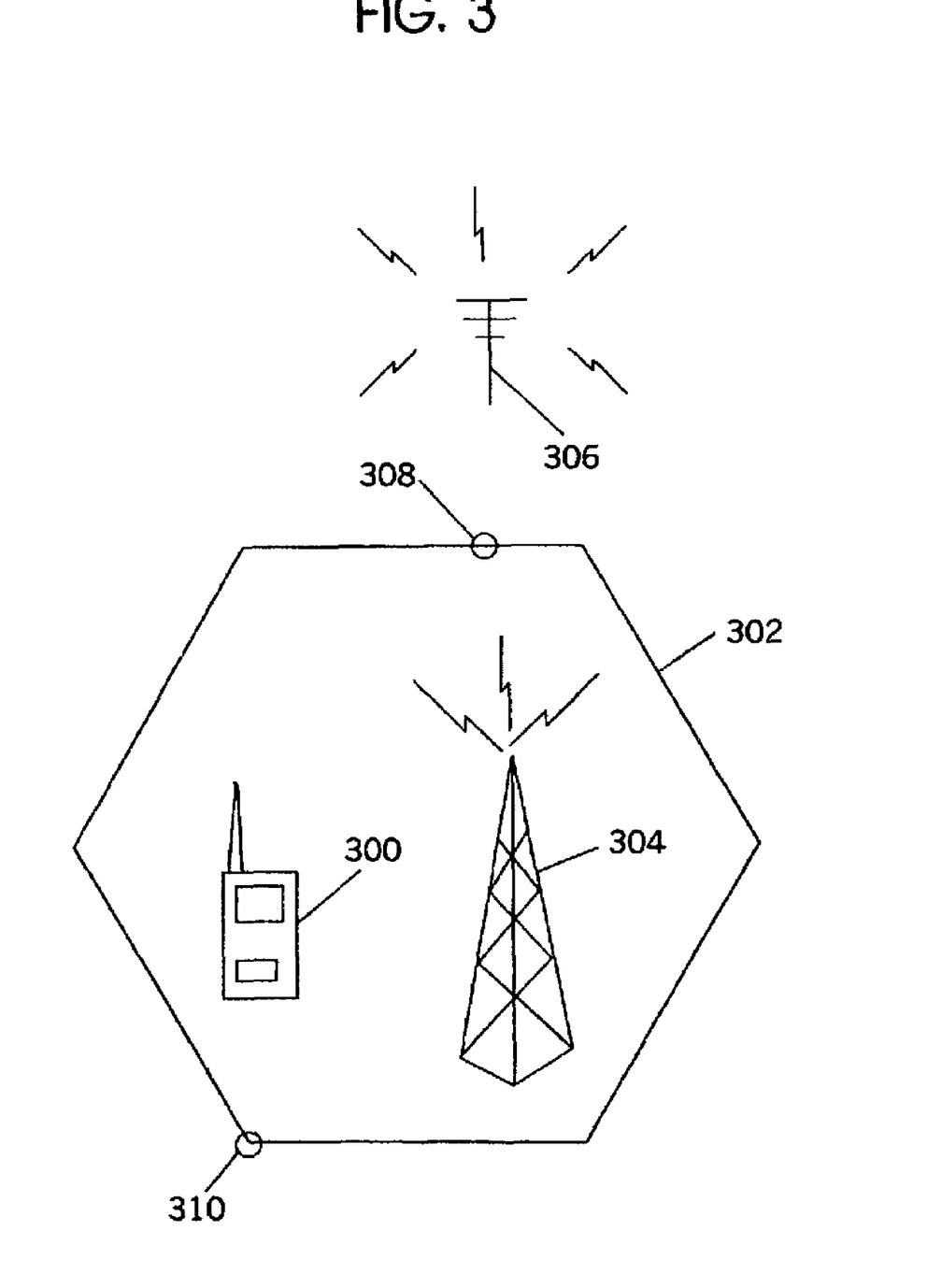
FIG. 3 is a diagram of a single cell of a wireless telecommunication network, illustrating one way in which a correlation search may be aided according to one embodiment of the present invention.

FIG. 3 illustrates how these limits are determined. In any system as described herein, there is a radio process being supported that is separate and apart from the DTV synchronization burst timing determination process. The approximate position of the mobile terminal is known because it is communicating with a known base station. Range limits which set the upper and lower extremes of a correlation window to be searched by the correlator can be used to limit the search to a range of possible timing shifts. FIG. 3 illustrates this process. It will be known that a mobile station 300 within a cell 302 is communicating with a specific base station, 304. For any given digital television transmitter, 306, the range of possible timing shifts is determined by the time of flight of the RF signal from the TV station to the nearest and farthest part of the cell in which the mobile terminal is operating, or points 308 and 310, respectively. Of course, time reference information as supplied externally would have to be used in order to set the limits on the correlation search. However, such timing information may be required anyway to use the DTV signals for ranging, as previously discussed.

Figure 4:
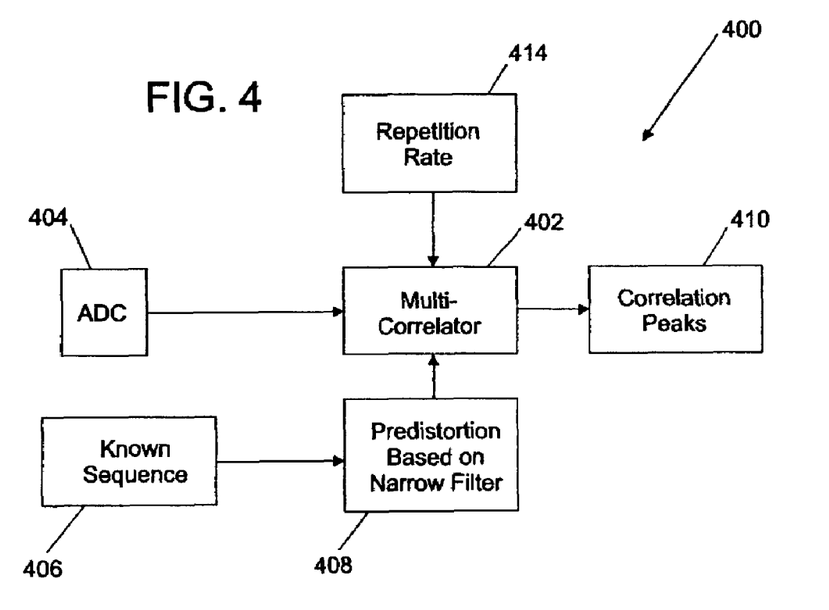
FIG. 4 is another block diagram of a correlation subsystem of a mobile terminal according to an embodiment of the invention.

FIG. 4 illustrates another embodiment of a correlation subsystem according to the invention again, connected to the ADC. In this case, multiple correlations are performed to insure accurate correlation, especially in the case where synchronization bursts are shorter than typical digital TV synchronization bursts. Correlation system 400 includes a multi-correlator, 402. Signals are received through ADC 404. Known sequence 406 has passed through a predistortion block, 408 as previously described. Multiple correlations result in correlation peaks 410, also similar to what was previously described with respect to FIG. 2. In this case however, a repetition rate, 414, is input to the multi-correlator to specify how often the correlation passes occur. This repetition rate is set based on the rate of the synchronization burst occurring within the ranging signal. The multiple correlations are performed at times separated by one over the repetition rate of the synchronization bursts. The probability of mistaken correlations with any part of the signal other than the synchronization burst goes down as more bursts are correlated at times equal to one over the synchronization burst repetition rate. Furthermore, the energy is accumulated in this way and offsets the energy lost due to the narrow bandpass of the baseband filter. Correlation using the method and apparatus illustrated in FIG. 4 does not have to reference external timing information in order to reduce correlation ambiguity.

FIGS. 5-8 are more complete block diagrams of various embodiments of a mobile terminal, which incorporates the present invention. It is important to understand that the block diagrams pictured in the figures are examples only; a mobile terminal can be designed in numerous ways without departing from the scope and spirit of the present invention. The illustrations shown in FIGS. 5-8 depict the receive sections of a mobile terminal only. Stages or elements not shown should be understood to be present as is typical in the current art. In particular, only the CDMA subsection of a mobile terminal will include transmit elements. However, these elements are omitted for clarity. For purposes of this disclosure, a CDMA subsection of the mobile terminal includes whatever elements and stages are dedicated to reception and/or transmission of CDMA or WCDMA signals. The ranging signal receiving subsystem of the mobile terminal includes whatever elements and stages are dedicated to this purpose. Shared elements and stages are those which are used in both CDMA signal reception and ranging signal reception. Which elements are shared and which elements are in dedicated subsystems can vary according to the embodiment. The exact design of a particular mobile terminal will be based on engineering decisions made by the designers.

In the example block diagrams shown within this disclosure, separate I and Q signal paths are illustrated from the radio frequency (RF) gain stage down to the digital signal processor (DSP). A stage of the system contains both the I and Q elements that perform the relevant function or functions, usually, implemented together, sometimes multiplied by two for the UMTS and ranging signals. In parts of the signal path where the signal is kept together, a stage contains a single element for UMTS and another element for ranging signals. A stage may also contain elements that perform different, but related functions. Where there is only one element for combined UMTS and ranging signals, a stage and an element are synonymous. The I and Q channels are necessary to receive all of the signal energy, as the receiver does not know the phase of the signal arriving. Finally, for the embodiments pictured in the example block diagrams shown within this disclosure, it is assumed that the ranging signals received are UHF, digital television signals. It should be understood that the invention could find use with systems that receive some other type of ranging signal.

Figure 5:
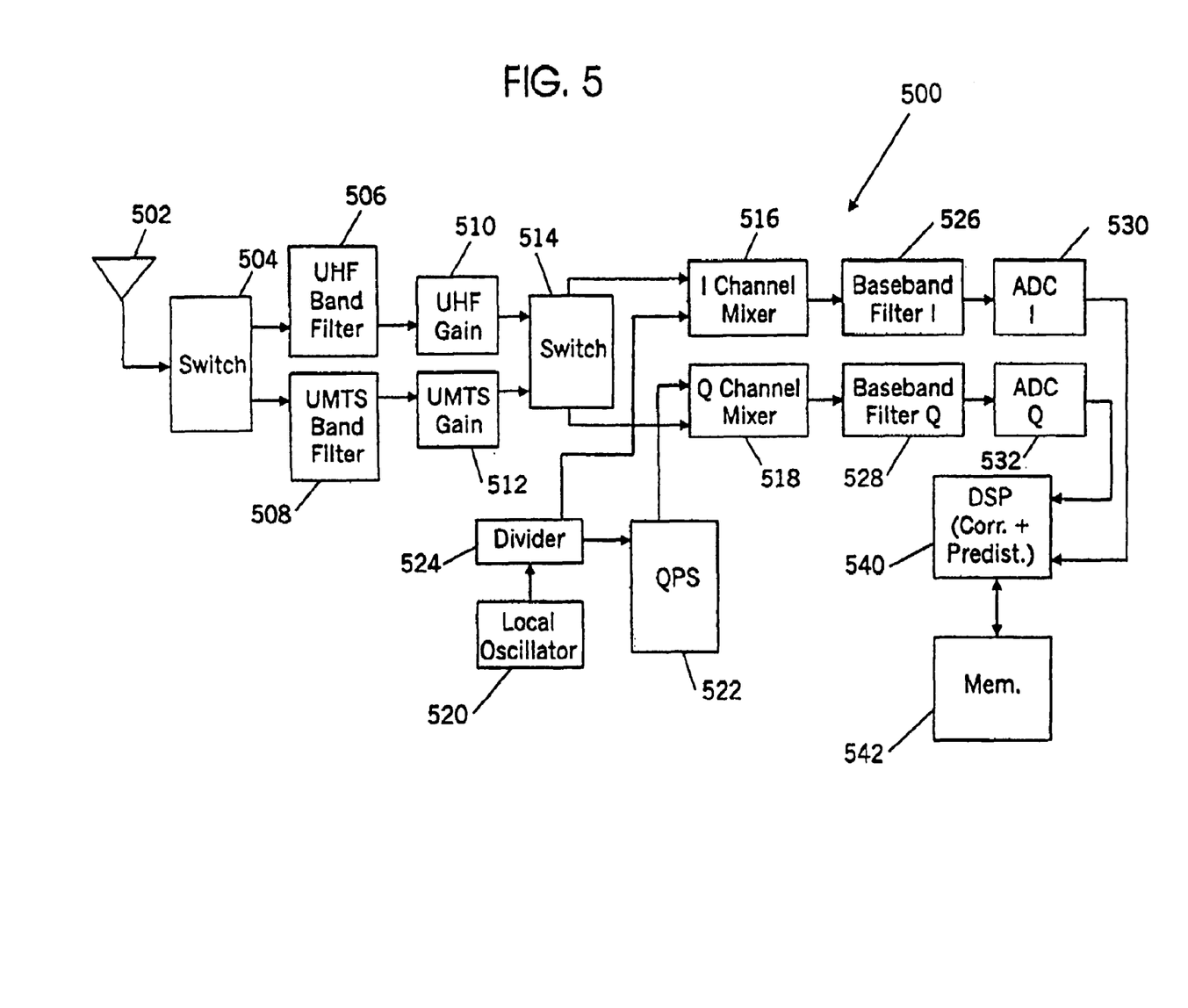
FIGS. 5-8 illustrate block diagrams of various alternative embodiments of a mobile terminal in which the present invention is being used.

Referring to FIG. 5, mobile terminal 500 includes a combined UHF and UMTS antenna, 502. The terminal also includes a switch, 504, for switching the antenna feed between the ranging signal receiving subsystem and the CDMA or UMTS subsystem. It will be understood by those of skill in the art that the same results may be obtained by using separate UMTS and UHF antennas, and no switch, as shown in and discussed with reference to FIG. 8. The terminal of FIG. 5 uses separate RF band filters for the ranging signal receiver subsystem and the CDMA/UMTS subsystem. In this example, UHF band filter 506 and UTMS band filter 508 are provided. Separate gain elements for UHF and UMTS are provided as shown at 510 and 512, respectively and form the RF amplifier stage. In some embodiments, these gain elements will be individual RF amplifiers. Next, switch 514 switches the signals applied to shared baseband and/or receiver stages. Depending on whether the receiver is a direct single conversion to baseband or a superheterodyne with more than one conversion, there exists multiple opportunities to share receiver hardware. In this example terminal, the I and Q branches of whichever signal is being received are broken apart and handled separately. The shared mixers are operatively connected to the subsystems through switch 514, and include I channel mixer element 516 and Q channel mixer element 518. The term operatively connected means connected so that signals pass from one element to another, notwithstanding that there may be intervening elements or stages or that the signals may be transformed in between. These mixers are both fed by local oscillator 520, a shared local oscillator. Divider 524 routes the local oscillator signal directly to mixer 516 and to a Quadrature phase shifter (QPS) 522. The quadrature phase shifter provides local oscillator signal to mixer 518, that has been shifted by 90 electrical degrees. This is the normal configuration for a single conversion receiver. The mixer, local oscillator, quadrature phase shifter 522, and the baseband filters 526 and 528, form the receiver. The common filter is used to process both signals. This use of a common filter is made possible through the correlation method of the invention. The common filter in this example embodiment comprises baseband filter element 526 for the I channel and baseband filter element 528 for the Q channel. In other embodiments, for instance, a superheterodyne receiver configuration, this common filter might actually be an IF filter that is part of the IF stage. A separate analog to digital converter (ADC) is provided for the I channel at 530 and the Q channel at 532. The filter and the ADC's form the baseband stage. DSP 540 provides and implements the correlation subsystem according to the present invention. It may also implement some or all of the channel filtering, in which case, filters 526 and 528 are less selective than would otherwise be required. The operation of the DSP is controlled by microcode which is stored in memory 542.

Figure 6:
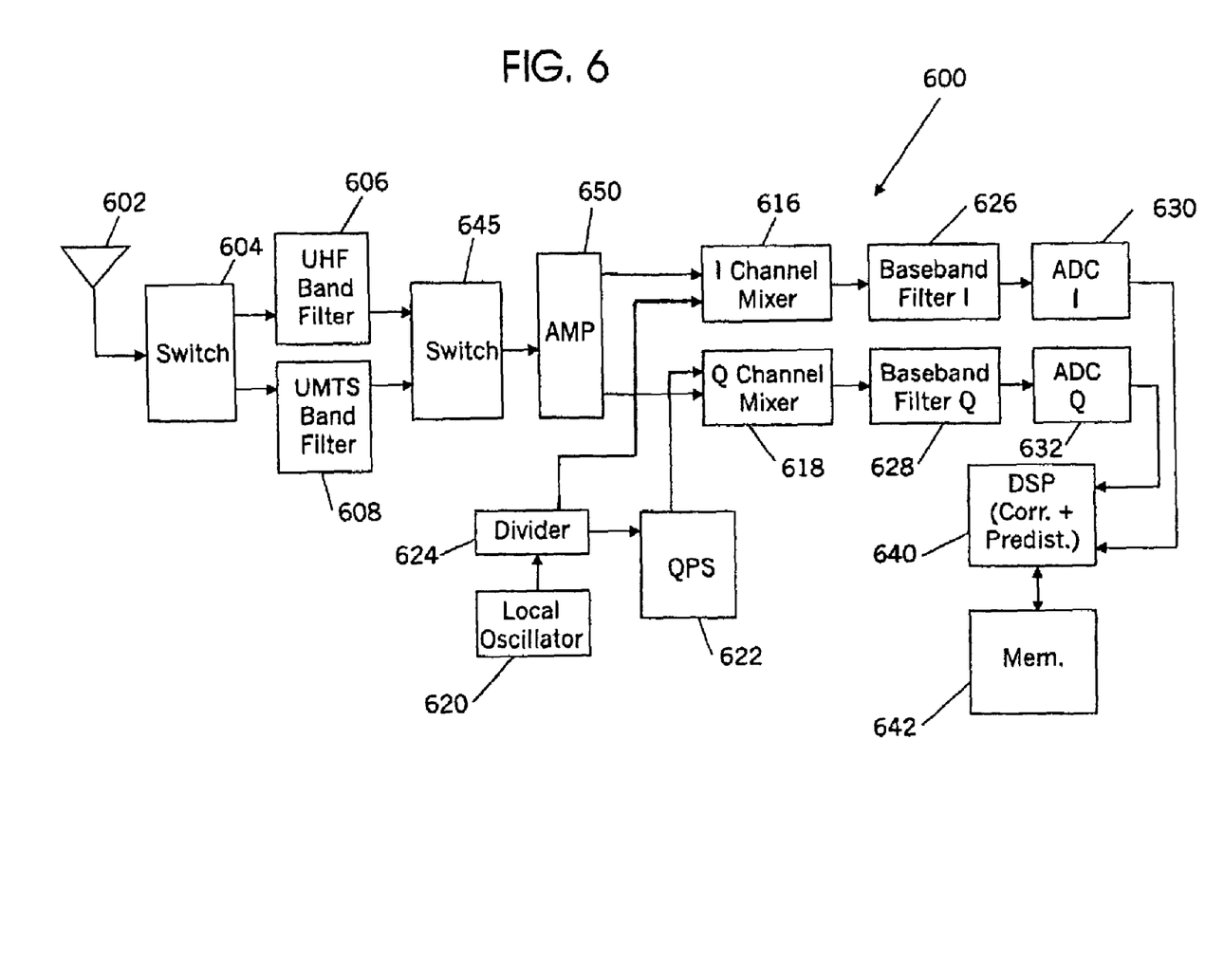

FIG. 6 illustrates another embodiment of a terminal which implements the method and apparatus of the present invention. The terminal, 600, of FIG. 6 includes most of the same elements and stages as the terminal of FIG. 5, as indicated by correlative reference numbers. These include antenna 602, switch 604, filters 606 and 608, filter and/or mixer elements 616, 618, 626, and 628, and ADC blocks 630 and 632. Local oscillator 620 feeds both divider 624 and directly, Quadrature phase shifter 622, all similar to the terminal of FIG. 5. The terminal of FIG. 6 also includes DSP 640 and memory 642 as before. However, the terminal of FIG. 6 includes switch 645 which is connected directly to the RF filters, 606 and 608. The terminal of FIG. 6 also includes shared amplifier 650 which is operatively connected to the ranging signal receiving subsystem and the CDMA subsystem through switch 645, and forms the RF amplifier stage. Shared amplifier 650 is a wide-band RF amplifier. This amplifier serves as the gain element for both the UHF band and the UMTS band. Such an amplifier can be implemented by incorporating switchable or variable elements into the amplifier design so that it operates in each band of interest appropriately.

Figure 7:
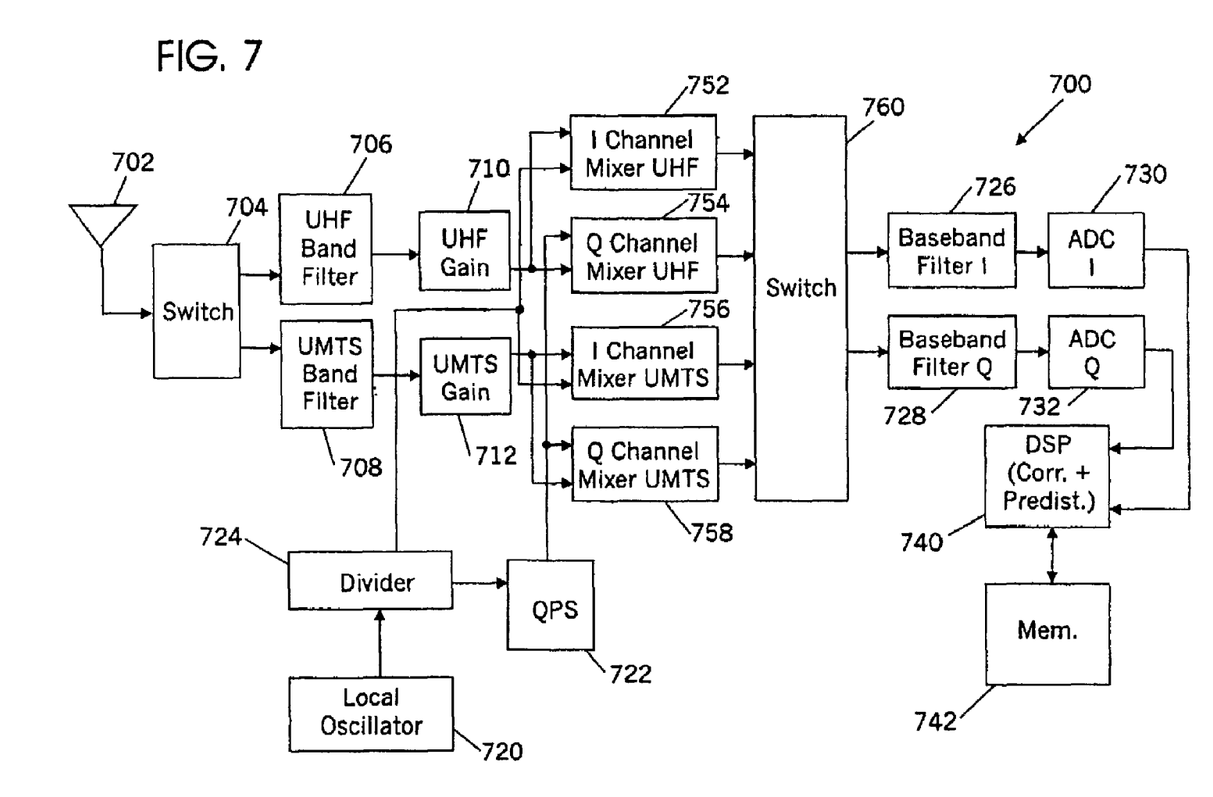

FIG. 7 is a block diagram of another embodiment of a mobile terminal implementing the invention. Terminal 700 of FIG. 7 again comprises many of the same stages and elements as described with respect to FIG. 5. These again are indicated by correlative reference numbers. These elements include antenna 702, switch 704, RF filters 706 and 708, and gain elements 710 and 712. Baseband filter elements 726 and 728 form a shared filter as before. ADC 730 and ADC 732 are shared for the I and Q channels respectively, as before. DSP 740 and memory 742 work as before. Terminal 700, however, includes separate mixers for the UHF and UMTS subsystems. Each mixer is again implemented as separate mixer elements for the I channel and the Q channel. I channel mixer element 752 and Q channel mixer element 754 serve as the mixer for the ranging signal receiving subsystem, in this case a UHF digital TV subsystem. I channel mixer element 756 and Q channel mixer element 758 together serve as the CDMA subsystem mixer, in this case for UMTS signals. Switch 760 serves to switch the subsystems so that they are operatively connected to the common filter, in this case made up of the I baseband filter element, 726 and the Q baseband filter element 728. Local oscillator signals are provided by local oscillator 720 in combination with Quadrature phase shifter 722 and divider 724 as in the previous embodiments. The four mixer elements and the divider, local oscillator, and switch 722 form the IF stage of the terminal of FIG. 7.

Figure 8:
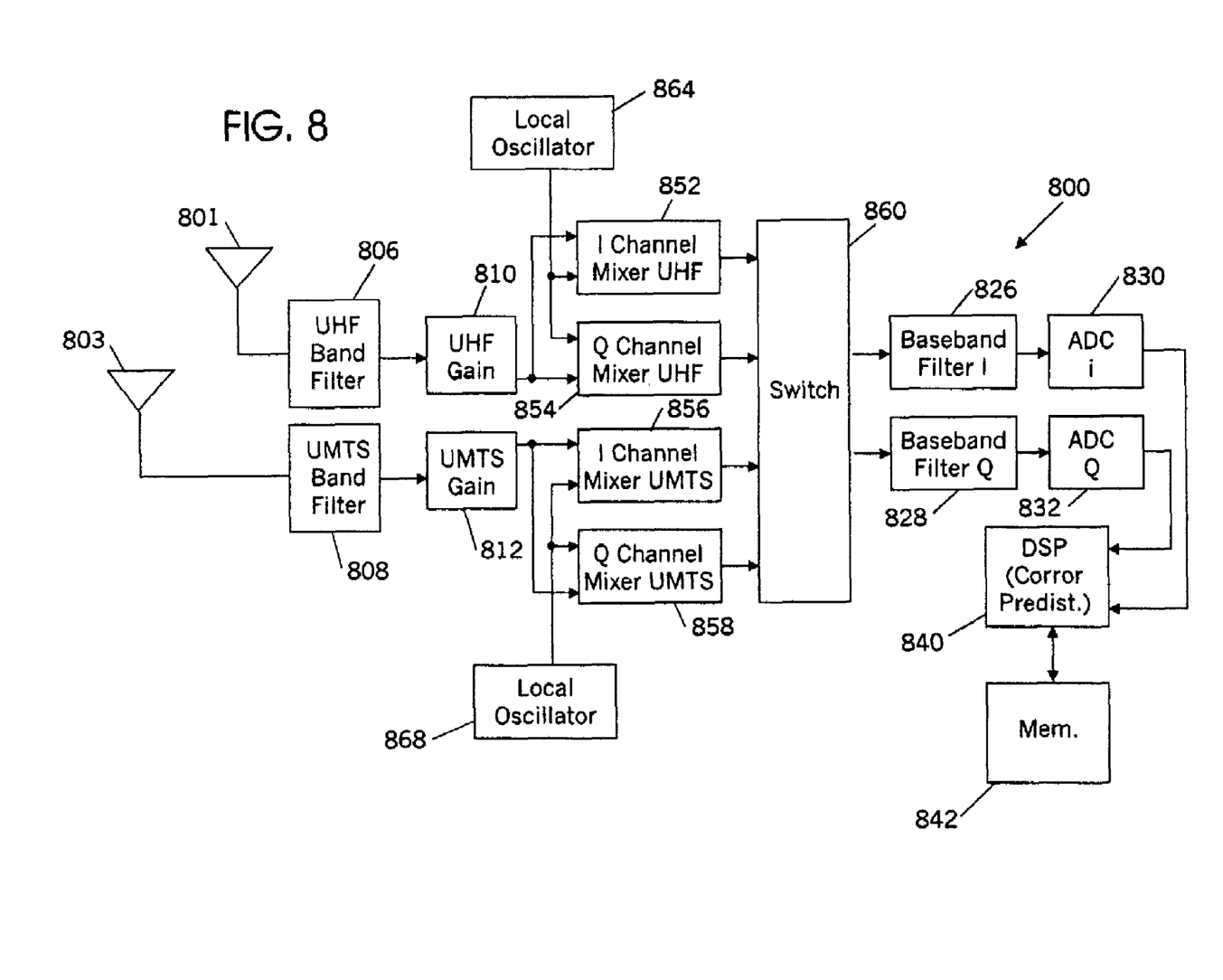

FIG. 8 shows mobile terminal 800, another embodiment of a mobile terminal, which implements the present invention. In this case, the antenna configuration is different from the previous examples. Terminal 800 is provided with separate UHF band and UMTS band antennas, 801 and 803, respectively. RF filters 806 and 808 and gain elements 810 and 812 are essentially the same as those previously illustrated. Terminal 800 includes a common filter made up of baseband filter element 826 for the I channel and baseband filter element 828 for the Q channel, similar to those previously discussed. ADC 830 performs analog to digital conversion for the I channel and ADC 832 performs it for the Q channel. DSP 840 and memory 842 function similarly to the DSP and memory with correlative reference numbers from the previously described embodiments. Terminal 800 again contains separate mixers for the CDMA and ranging signal receiving subsystems as shown in FIG. 7. These are implemented by mixer elements 852, 854, 856, 858, operatively connected to switch 860. Another difference between the terminal of FIG. 8 and the terminal of FIG. 7 is that the terminal of FIG. 8 includes a dedicated local oscillator for each of the receiving subsystems. Local oscillator 864 services the ranging signal UHF mixer and local oscillator 868 services the UMTS CDMA subsystem mixer. It is important to recognize that the various block diagrams shown are illustrative examples only and numerous elements of the architectures could be combined in almost infinite ways. The exact design of the mobile terminal architecture is an engineering decision which is to be determined based on practical considerations.

A mobile terminal implementation of an embodiment of the invention does not have to be limited to a traditional cellular telephone type of mobile terminal, but may include devices with or without a multi-line display; a so-called personal communication system (PCS) terminal that combines a cellular phone with data processing facsimile and data communications capabilities; a personal data assistant (PDA) that includes the functions of an organizer; devices that include internet access, web browsers, and pagers; as well as conventional laptop or palmtop computers which include radio transceivers. A mobile terminal according to the invention may also be a so-called (pervasive computing) device.

Specific embodiments of an invention are described herein. Those of ordinary skill in the wireless communication and signal processing arts will recognize that the application has other applications in other environments. In fact, many embodiments and implementations of the invention are possible. The following claims are in no way intended to limit the scope of the invention to the specific embodiments described.

I claim:

1. A mobile terminal comprising:
    a radio subsystem operable to receive a radio signal;
    a ranging signal receiving subsystem for receiving digital television (DTV) signals for use as terrestrial ranging signals, a DTV signal comprising synchronization bursts which are equally spaced in time;
    a filter operatively connected to and shared in common with both the radio subsystem and the ranging signal receiving subsystem, the filter having a bandpass that is smaller than a bandwidth of the DTV signal; and
    a correlation subsystem operatively connected to the filter, the correlation subsystem operable to enable recovery of the synchronization bursts without demodulating the DTV signal by correlating the DTV signal with a known sequence that has been predistorted to account for the bandpass of the filter.

2. The mobile terminal of claim 1 wherein the correlation subsystem correlates the DTV signal at least in part by searching a correlation window that is determined at least in part by an approximate location of the mobile terminal within a network.

3. The mobile terminal of claim 1 wherein the correlation subsystem correlates the DTV signal at least in part by performing multiple correlations at times separated by one over a known rate of occurrence of the synchronization bursts.

4. The mobile terminal of claim 1 further comprising a shared mixer operatively connected to the radio subsystem and the ranging signal receiving subsystem.

5. The mobile terminal of claim 4 further comprising a shared amplifier operatively connected to the radio subsystem and the ranging signal receiving subsystem.

6. The mobile terminal of claim 2 further comprising a shared mixer operatively connected to the radio subsystem and the ranging signal receiving subsystem.

7. The mobile terminal of claim 6 further comprising a shared amplifier operatively connected to the radio subsystem and the ranging signal receiving subsystem.

8. The mobile terminal of claim 3 further comprising a shared mixer operatively connected to the radio subsystem and the ranging signal receiving subsystem.

9. The mobile terminal of claim 8 further comprising a shared amplifier operatively connected to the radio subsystem and the ranging signal receiving subsystem.

10. A method of processing a digital television (DTV) signal for use as a terrestrial ranging signal in a mobile terminal implementing a terrestrial ranging signal receiver, the method comprising:
    receiving the DTV signal, the DTV signal comprising synchronization bursts which are equally spaced in time;
    passing the DTV signal through a filter shared in common with both the ranging signal receiver and a radio subsystem of the mobile terminal, the filter having a bandpass that is smaller than the bandwidth of the DTV signal, but substantially equal to or greater than the bandwidth of a native radio signal; and
    recovering the synchronization bursts without demodulating the DTV signal by correlating the DTV signal with a known sequence that has been predistorted to account for the bandpass of the filter.

11. The method of claim 10, wherein the recovering of the synchronization bursts is accomplished at least in part by searching a correlation window that is determined by an approximate location of the mobile terminal within a network.

12. The method of claim 10 wherein the recovering of the synchronization bursts is accomplished at least in part by performing multiple correlations at times separated by one over a known rate of occurrence of the synchronization bursts.

13. Apparatus providing mobile terminal function and terrestrial ranging signal function, the apparatus comprising:
    means for receiving a digital television (DTV) signal for use as a terrestrial ranging signal, the DTV signal comprising synchronization bursts which are equally spaced in time;
    means for passing the DTV signal through a filter shared in common with both the means for receiving a DTV signal and a radio subsystem of the apparatus, the filter having a bandpass that is smaller than the bandwidth of the DTV signal, but substantially equal to or greater than the bandwidth of a native radio signal; and
    means for recovering the synchronization bursts without demodulating the DTV signal by correlating the DTV signal with a known sequence that has been predistorted to account for the bandpass of the filter.

14. The apparatus of claim 13 wherein the means for recovering further comprises means for searching a correlation window that is determined by an approximate location of the mobile terminal within a network.

15. The apparatus of claim 13 wherein the means for recovering further comprises means for performing multiple correlations at times separated by one over a known rate of occurrence of the synchronization bursts.

* * * * *